(12) United States Patent
Campero et al.

(10) Patent No.: US 10,393,554 B2
(45) Date of Patent: Aug. 27, 2019

(54) SECURITY SYSTEM HAVING A MAGNETIC DISPLACEMENT SENSOR SYSTEM AND ANALYTICS SYSTEM

(71) Applicant: Sensormatic Electronics, LLC, Boca Raton, FL (US)

(72) Inventors: Richard John Campero, Gilroy, CA (US); Miguel Galvez, Salem, NH (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 618 days.

(21) Appl. No.: 15/019,260

(22) Filed: Feb. 9, 2016

(65) Prior Publication Data

US 2017/0227386 A1    Aug. 10, 2017

(51) Int. Cl.
| G01D 18/00 | (2006.01) |
|---|---|
| G01D 5/12 | (2006.01) |
| G08B 13/08 | (2006.01) |

(52) U.S. Cl.
CPC ............. *G01D 18/00* (2013.01); *G01D 5/12* (2013.01); *G08B 13/08* (2013.01)

(58) Field of Classification Search
CPC .......... G01D 18/00; G01D 5/12; G08B 13/08
USPC ...... 324/200, 207.11–207.15, 211, 220, 233, 324/500, 529, 530, 234–247, 160, 177, 324/169, 139, 765.01
See application file for complete search history.

(56) References Cited

U.S. PATENT DOCUMENTS

| 7,859,404 | B2 | 12/2010 | Chul Lee et al. |
|---|---|---|---|
| 8,970,373 | B2 | 3/2015 | Buckley et al. |
| 9,196,137 | B2 | 11/2015 | Shapira et al. |
| 9,197,277 | B2 | 11/2015 | Okun et al. |
| 9,817,439 | B2* | 11/2017 | Gosieski, Jr. ........... G06F 1/163 |
| 2005/0280532 | A1* | 12/2005 | Moldavsky .......... G01D 5/2033 340/540 |
| 2007/0139195 | A1* | 6/2007 | Jin ......................... G08B 13/08 340/547 |
| 2008/0030328 | A1 | 2/2008 | Sharma |
| 2015/0339407 | A1* | 11/2015 | Gallo ..................... G08B 25/10 707/736 |
| 2016/0290005 | A1* | 10/2016 | Goldenson ......... G01R 33/0206 |

OTHER PUBLICATIONS

Maxim Guidelines for Reliable Long Line 1-Wire Networks Tutorial. http://www.maximintegrated.com/en/app-notes/index.mvp/id/148, downloaded Dec. 29, 2015. Twenty-two pages.
"Using techBASIC to Turn Your iPhone or iPad into a Metal Detector," techBlog, http://www.byteworks.us/Byte_Works/Blog/Entries/2011/11/30. Nov. 30, 2011, Byte Works, Inc. Six pages.
Xtrinsic MAG3110 Magnetometer, freescale.com/magnetic. 2010-2014, Freescale Semiconductor, Inc. Two pages.

* cited by examiner

*Primary Examiner* — Melissa J Koval
*Assistant Examiner* — Trung Nguyen
(74) *Attorney, Agent, or Firm* — Arent Fox LLP (57) ABSTRACT

A security system having a magnetic displacement sensor system and an analytics system. The magnetic displacement sensor system includes a displacement sensor for detecting a magnetic field strength from a magnet. The analytics system determines a status of the magnetic displacement sensor system based on a comparison of the detected magnetic field strength and a profile for the magnetic displacement sensor system.

23 Claims, 11 Drawing Sheets

SECURITY SYSTEM HAVING A MAGNETIC DISPLACEMENT SENSOR SYSTEM AND ANALYTICS SYSTEM

BACKGROUND OF THE INVENTION

Magnetic displacement sensor systems are a common subsystem in many intrusion systems, and security systems more generally. Most often, these magnetic displacement sensor systems are used to detect whether doors or windows are ajar or secured. More generally, however, magnetic displacement sensor systems can be used in other applications that require proximity and/or end position sensing, or moving part position sensing. In these intrusion/security systems, the magnetic displacement sensor systems are typically monitored by a system control panel via a network. In this way, the control panel can monitor whether doors or windows are ajar, or secured, for example.

The magnetic displacement sensor systems have traditionally included magnets and reed switches. When the magnets, which are usually installed on the moving parts, are brought into proximity of the reed switches, which are usually installed on adjacent portions of stationary parts, the contacts of switches are closed and the switches are conductive. The control panels then monitor the conductivity of the reed switches.

More recently, it has been proposed to use magnetometers in place of the traditional reed switches. The magnetometers detect strength of the magnetic field generated from the magnets. The corresponding magnetic displacement sensors then determine whether the door, for example, is ajar, or not, by determining whether the magnetic field strength detected by the magnetometers are greater or less than a threshold, which is typically established through a calibration step.

SUMMARY OF THE INVENTION

Reed switch-based magnetic displacement sensor systems often require maintenance. The reed switches themselves can break. The magnets on the moving parts can become displaced such that there may be insufficient magnetic field at the switch to close the switch, even when the door is completely closed. Such displacement can also result in intermittent failure. The magnetic field at the switch may be just sufficient to close the switch but may open if the switch or the door is merely bumped to thereby result in transient operation.

The present invention relates to magnetic displacement sensor systems that incorporate magnetometers. In examples, it concerns the tracking of the behavior of the systems in order to determine the status of the magnetic displacement sensor systems. As a result, problems such as sensor damage or displacement or other miscalibration can be assessed. This allows preventative maintenance or simply determining the health of the sensor systems to assess the validity of the data from them.

In general, according to one aspect, the invention features a security system having a magnetic displacement sensor system and an analytics system. The magnetic displacement sensor system includes a displacement sensor for detecting a magnetic field strength from a magnet. The analytics system determines a status of the magnetic displacement sensor system based on a comparison of the detected magnetic field strength and a profile for the magnetic displacement sensor system.

There is a variety of statuses for the magnetic displacement sensor system. Each status relates to a condition or a state of the magnetic displacement sensor system. Example statuses can include a normal status, a damaged sensor status, a displaced sensor status, or a predictive failure status.

There are different rates (e.g., fast, close) at which a door or window can be opened or closed. Example profiles (corresponding with the door or window) for the magnetic displacement sensor system can include: a time normalized profile, an open slow profile, a closed slow profile, an open fast profile, a closed fast profile, a secured state profile, or an unsecured state profile. The analytics system can update these one or more profiles based on detected magnetic field strengths received from the displacement sensor over time.

The analytics system can be implemented locally or remotely with respect to a system control panel. In one example, the analytics system is implemented locally by integrating the analytics system within the system control panel. In another example, the analytics system is implemented remotely as a cloud-based system comprising profiles stored in an analytics database for multiple clients.

The displacement sensor preferably includes a 3-axis magnetometer having a detection stage for detecting the magnetic field strength along an x-axis, a y-axis, and a z-axis.

The displacement sensor can further include a controller for reading the magnetic field strength from the 3-axis magnetometer and determining if the detected magnetic field strength indicates an event. The controller preferably includes a buffer for storing the read magnetic field strength.

The 3-axis magnetometer and the controller can be integrated on a single chip.

The displacement sensor can be powered by different means. In one example, the displacement sensor is powered by a battery and the displacement sensor includes a parasitic power-harvesting circuit for charging the battery. In another example, the security system includes a system control panel for powering the displacement sensor via a network.

In general, according to another aspect, the invention features a method for determining a status of a magnetic displacement sensor system. The method comprises a displacement sensor detecting a magnetic field strength from a magnet. The displacement sensor determines if the detected magnetic field strength indicates an event. The displacement sensor sends the event including the detected magnetic field strength to an analytics system. The analytics system compares the event to an event profile for the magnetic displacement sensor system. The analytics system determines the status of the magnetic displacement sensor system based on this comparison.

The method can include further steps for the analytics system. The analytics system can determine whether the event is an opening type of event or a closing type of event. The analytics system can normalize a time axis for the event profile. The analytics system can dynamically update the event profile based on receipt of multiple events from the displacement sensor over time.

The analytics system can generate a diagnostic assessment based on the determined status of the magnetic displacement sensor system. The analytics system can send this diagnostic assessment to a system control panel. The system control panel notifies a user of necessary repairs based on the diagnostic assessment.

In general, according to another aspect, the invention features a magnetic displacement sensor system having a magnet mounted to a window or a door and a displacement sensor. The displacement sensor includes an interface in communication with a network, a magnetometer for detecting a magnetic field strength from the magnet, and a controller for reading the magnetic field strength from the magnetometer and determining if the detected magnetic field strength indicates an event. The controller sends the event, including the magnetic field strength, to a system control panel via the interface.

In general, according to another aspect, the invention features a security system that comprises a magnetic displacement sensor system including a displacement sensor for detecting a magnetic field strength from a magnet and an analytics system for determining a status of the magnetic displacement sensor system based on a comparison of the detected magnetic field strength and a profile for the magnetic displacement sensor system.

In general, according to another aspect, the invention features an analytics system that determines a status of magnetic displacement sensor systems based on a comparison of the detected magnetic field strength and a profile for the magnetic displacement sensor systems.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
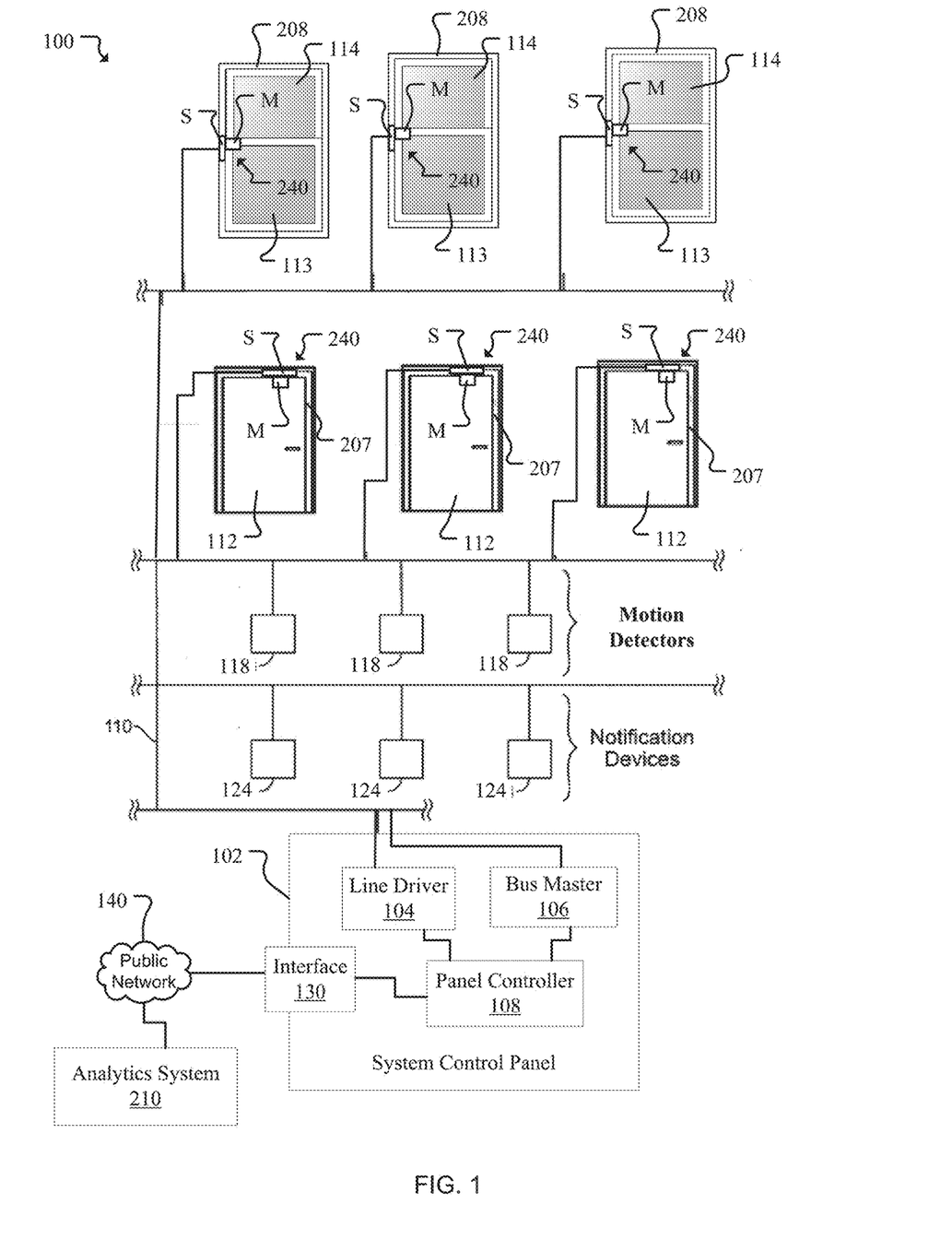
FIG. 1 is a schematic diagram of a security system including a magnetic displacement sensor system and an analytics system.
Figure 2:
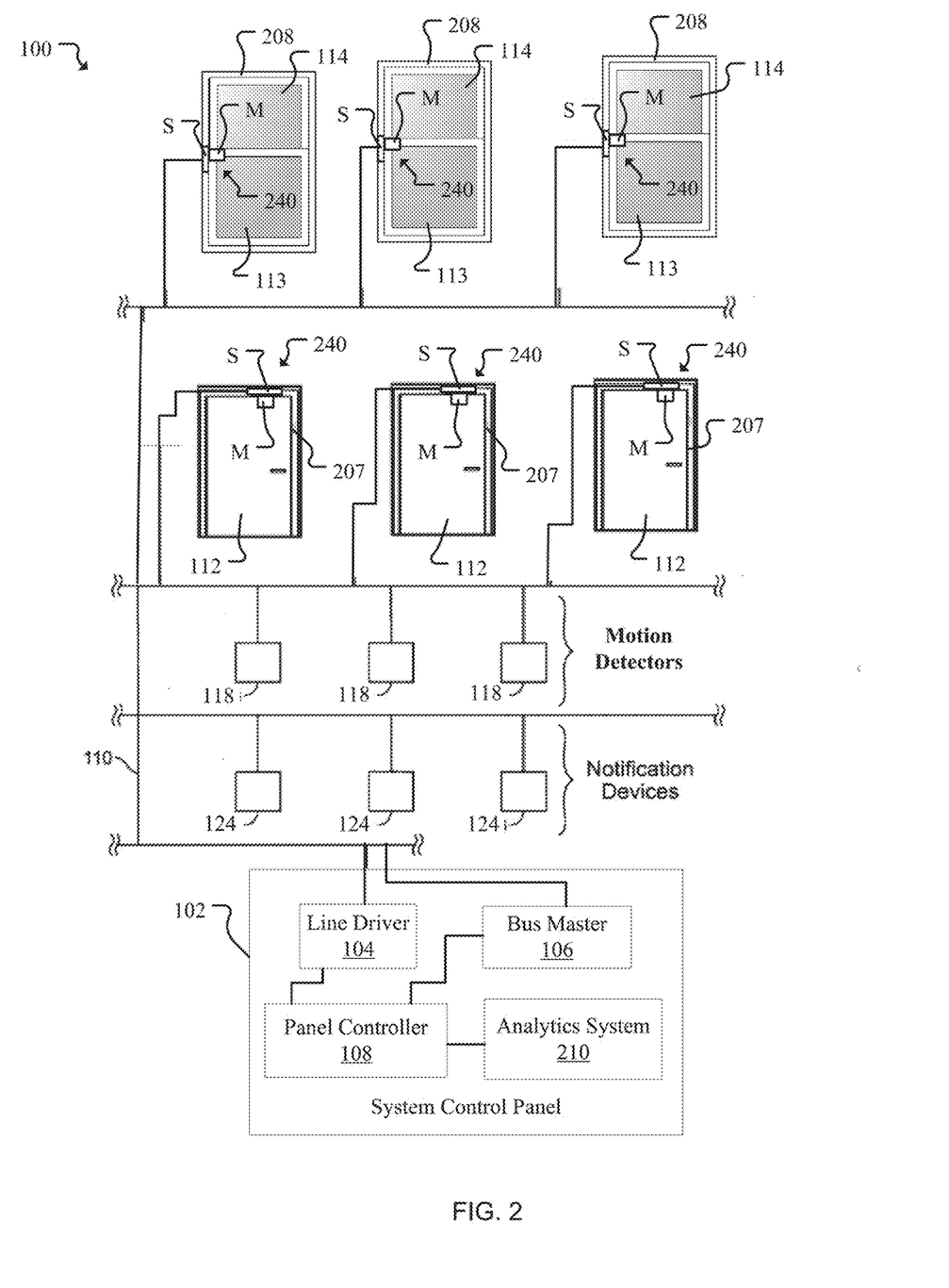
FIG. 2 is a schematic diagram of another security system including the magnetic displacement sensor system and the analytics system.

FIGS. 1 and 2 depict a security system 100 that includes magnetic displacement sensor systems 240 and an analytics system 210 for monitoring the magnetic displacement sensor systems 240. The analytics system 210 determines a status for each magnetic displacement sensor system 240 by monitoring their operation.

Each magnetic displacement sensor system 240 includes a displacement sensor S and a magnet M. The displacement sensor S detects a magnetic field strength experienced by the displacement sensor S from the magnet. Thus, as the magnet M moves further from the displacement sensor S, such as in the process of opening a window, the displacement sensor S detects a decrease in the magnetic field strength.

As illustrated, the magnetic displacement sensor systems 240 are typically installed to detect whether doors and windows are ajar or secured. Each displacement sensor S is usually mounted either on a door frame 207 or on a window frame 208 and each magnet M is mounted to the corresponding door 112 or window 113. As the door 112 is opened, the magnet M is moved away from the displacement sensor S fixed on the door frame 207 causing the displacement sensor S to measure a decrease in the magnetic field strength. Similarly, as the window 113 is opened (e.g., sliding window 113 past an outer window 114 for a double-hung window), the magnet M is moved away from the displacement sensor S fixed on the window frame 208 causing a decrease in magnetic field strength. As appreciated by one of skill in the art, the magnetic displacement sensor systems 240 can be used in other applications that require proximity and/or end position sensing or moving part position sensing.

The displacement sensors S are monitored and in some cases powered by a system control panel 102. The system control panel 102 communicates with and powers the displacement sensor S via a safety and security network 110 (e.g., microLAN). Specifically, the system control panel 102 includes a line driver 103 that delivers power to the safety and security network 110 for powering the displacement sensors S. Also, the system control panel 102 includes a bus master 106 (e.g., 1-wire bus master) for providing communication with the displacement sensors S on the safety and security network 110. The system control panel 102 uses a panel controller 108 for instructing the line driver 103 and the bus master 106 with respect to providing communication and delivering power to the displacement sensor S.

The displacement sensors S can be deployed on the safety and security network 110 using a single bus or multiple buses. The single bus can be implemented, for example, in the form of a linear topology, a stubbed topology, or a star topology. The single bus can include a 2-wire interface (e.g., 1-Wire® technology) that allows for power and communication (i.e., data) to be supported on the single bus. Alternatively, power and communication (i.e., data) can be supported on multiple buses (e.g., separate power buses and separate communication buses using 3-wire and/or 4-wire implementations). Each bus can utilize RS-422, RS-485, or CAN standards. Also, each bus is configured to provide addressability such that the displacement sensors S can be uniquely identified. This allows the system control panel 102 to uniquely identify and automatically discover the displacement sensors S on the safety and security network 110.

The analytics system 210 receives the magnetic field strength measurements from the system control panel 102 either locally or remotely. In FIG. 1, the analytics system 210 is implemented remotely with respect to the system control panel 102. In this example, the system control panel 102 directs the magnetic field strength measurements to a public network 140 via its network interface 130. The analytics system 210 then remotely receives the detected magnetic field strength measurements from the public network 140. For this example, the analytics system 210 can be implemented as a cloud-based system. In FIG. 2, the analytics system 210 is implemented locally by integrating the analytics system 210 into the system control panel 102. For this example, the analytics system 210 can be implemented as a sub-system or module within the system control panel 102 or as a process or thread that runs on the panel microprocessor.

The analytics system 210 determines a status of each magnetic displacement sensor system 240 based on the received magnetic field strength measurements. Specifically, the analytics system 210 determines the status for each magnetic displacement sensor system 240 based on a comparison of the detected magnetic field strength measurements with at least one profile (e.g., monitoring and looking for predictable patterns between the detected magnetic field strength measurements and the profile). By comparing patterns, the analytics system 210 can determine, for example, whether a change in magnetic field strength is normal as well as determine a magnetic field strength threshold needed to decrease a likelihood of a false alarm. Thus, the analytics system's determinations can be used to make the necessary dynamic adjustments based to reduce false alarms.

The security system 100 typically includes motion detectors 118 and addressable notification devices 124 installed on the safety and security network 110. The motion detectors 118 generate motion data by sensing motion and then sending the motion data to the system control panel 102. The system control panel 102 can determine if an intrusion occurs based on the motion data. The system control panel 102 activates the addressable notification devices 124 (e.g., speakers, strobes, and/or strobe/speaker combo devices) for alerting occupants of alarm conditions such as intrusion, potential fire, etc.

Figure 3A:
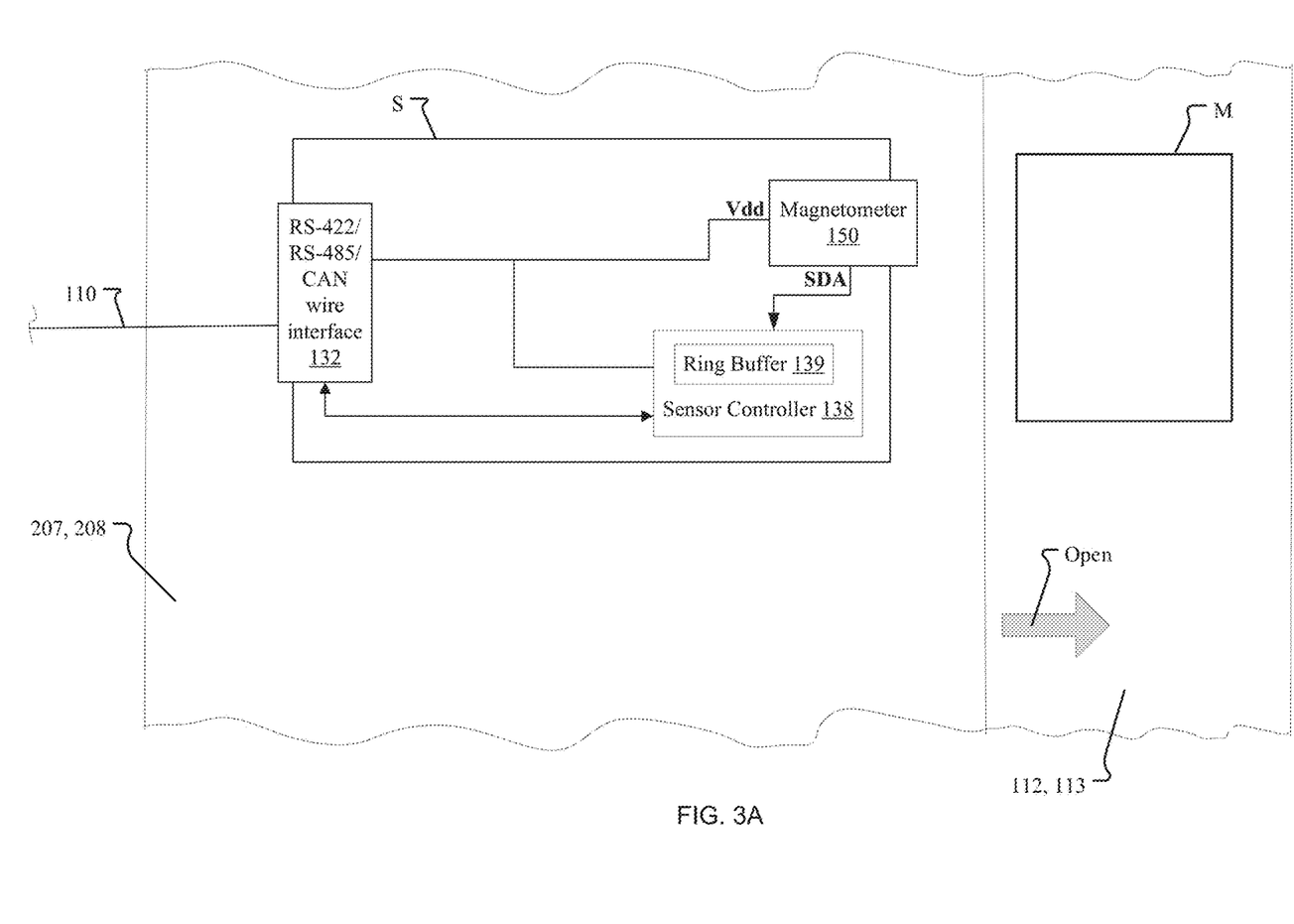
FIG. 3A is a detailed schematic view of the magnetic displacement sensor system.

FIG. 3A schematically depicts the internal components of the displacement sensor S in relation to the magnet M installed on the door 112/window 113.

The displacement sensor S includes a magnetometer 150 for detecting the magnetic field strength. In one example, the magnetometer 150 is a single axis magnetometer that detects a magnitude of the magnetic field strength along one axis. In another example, the magnetometer 150 is a 2-axis magnetometer that detects magnetic field strength 2-dimensionally along two axes (e.g., x-axis and y-axis). In another example, the magnetometer 150 is a 3-axis magnetometer that detects magnetic field strength 3-dimensionally along the x-axis, the y-axis, and a z-axis. The magnetometer 150 sends data (i.e., magnetic field strength measurements) via a data pin SDA and receives power at a positive supply voltage pin Vdd.

The displacement sensor S has a sensor controller 138 for identifying events based on the magnetic field strength samples or measurements and directing communication of these events. Initially, the sensor controller 138 reads the magnetic field strength measurements from the magnetometer 150. The sensor controller 138 preferably includes a ring buffer or similar set of data storage registers 139 for storing these recently read magnetic field strength measurements over time. This buffer can contain 5 to 10 or more of the most recently read magnetic field strength measurements, with new measurements overwriting the oldest measurements. The sensor controller 138 can identify the events by determining if the stored magnetic field strength measurements indicate an event such as an open door or closed door. In one example, the buffer stores readings over the previous period. Such period can be less than 1 second in one example. In other examples, it can be more than 1 second or even more than 10 seconds. Additionally, the magnetic field measurements are often taken at intervals of less than 500 milliseconds. In some examples, the magnetic field measurements are taken at intervals of less than 100 milliseconds.

When the sensor controller 138 determines that an event has occurred, the contents of the ring buffer are sent (including respective magnetic field strength measurements) to the system control panel 102 (where the ring buffer contents are received by the bus master 106) via the safety and security network 110 as event data. The sensor controller 138 is preferably a microprocessor (e.g., ASIC microprocessor or FPGA microprocessor). In one example, the sensor controller 138 can be integrated with the magnetometer 150 on a single chip.

The displacement sensor S has a RS-422/RS-485/CAN wire interface 13 for receiving power and sending/receiving communication in examples. The RS-422/RS-485/CAN wire interface 132 can receive power from the system control panel 102 via the safety and security network 110. The RS-422/RS-485/CAN wire interface 132 can direct the received power to a sensor power bus that distributes power between the magnetometer 150 and the sensor controller 138. The RS-422/RS-485/CAN wire interface 132 can also direct communication received from the safety and security network 110 to the sensor controller 138 and direct communication (e.g., magnetic field strength measurements) from the sensor controller 138 to the safety and security network 110.

FIG. 3A illustrates the displacement sensor S in use during an opening event for the door 112/window 113. As the door 112/window 113 is opened, the magnet M is moved away from the displacement sensor S causing the displacement sensor S to detect a decrease in the magnetic field strength.

Figure 3B:
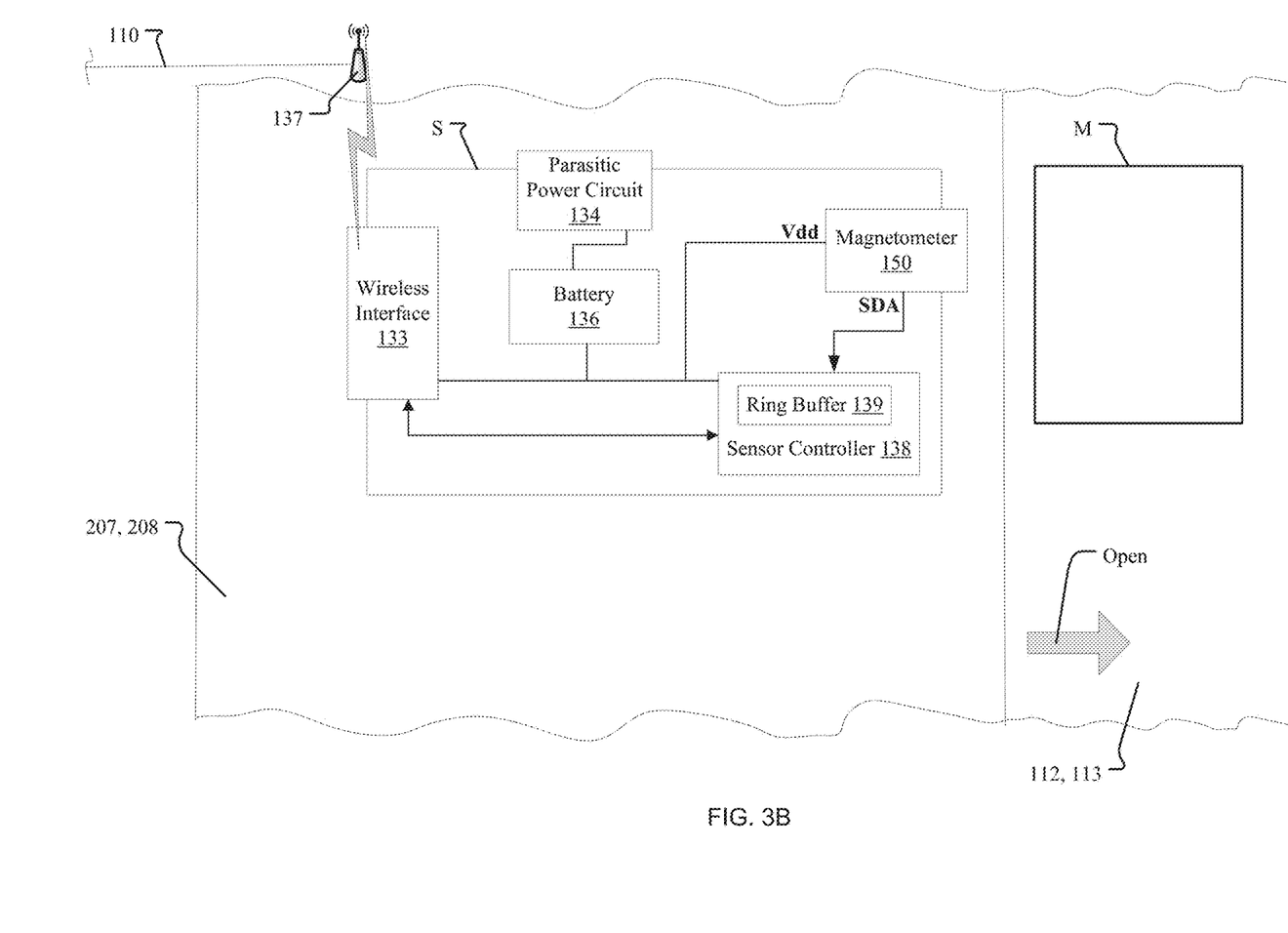
FIG. 3B is a detailed schematic view of another embodiment of the magnetic displacement sensor system.

FIG. 3B is nearly identical to FIG. 3A except the displacement sensor S communicates wirelessly with the system control panel 102 via the safety and security network 110. In this example embodiment, the RS-422/RS-485/CAN wire interface 132 is replaced with a wireless interface 133 that wirelessly connects with the system control panel 102 via the safety and security network 110. Specifically, the wireless interface 133 communicates with the safety and security network 110 via an access point 137 (e.g., using Bluetooth Zigbee or WiFi communications protocols, for example). For this example, the displacement sensor S is supplied powered from a battery 136 and a parasitic power-harvesting circuit 134. Specifically, the parasitic power-harvesting circuit 134 supplies power to be stored in the battery 136. Then, the battery 136 directs power to the sensor power bus for distribution between the magnetometer 150, the sensor controller 138, and the wireless interface 133. As appreciated by one of skill in the art, other power arrangements may be implemented in order to power the different components of the displacement sensor S.

Figure 4:
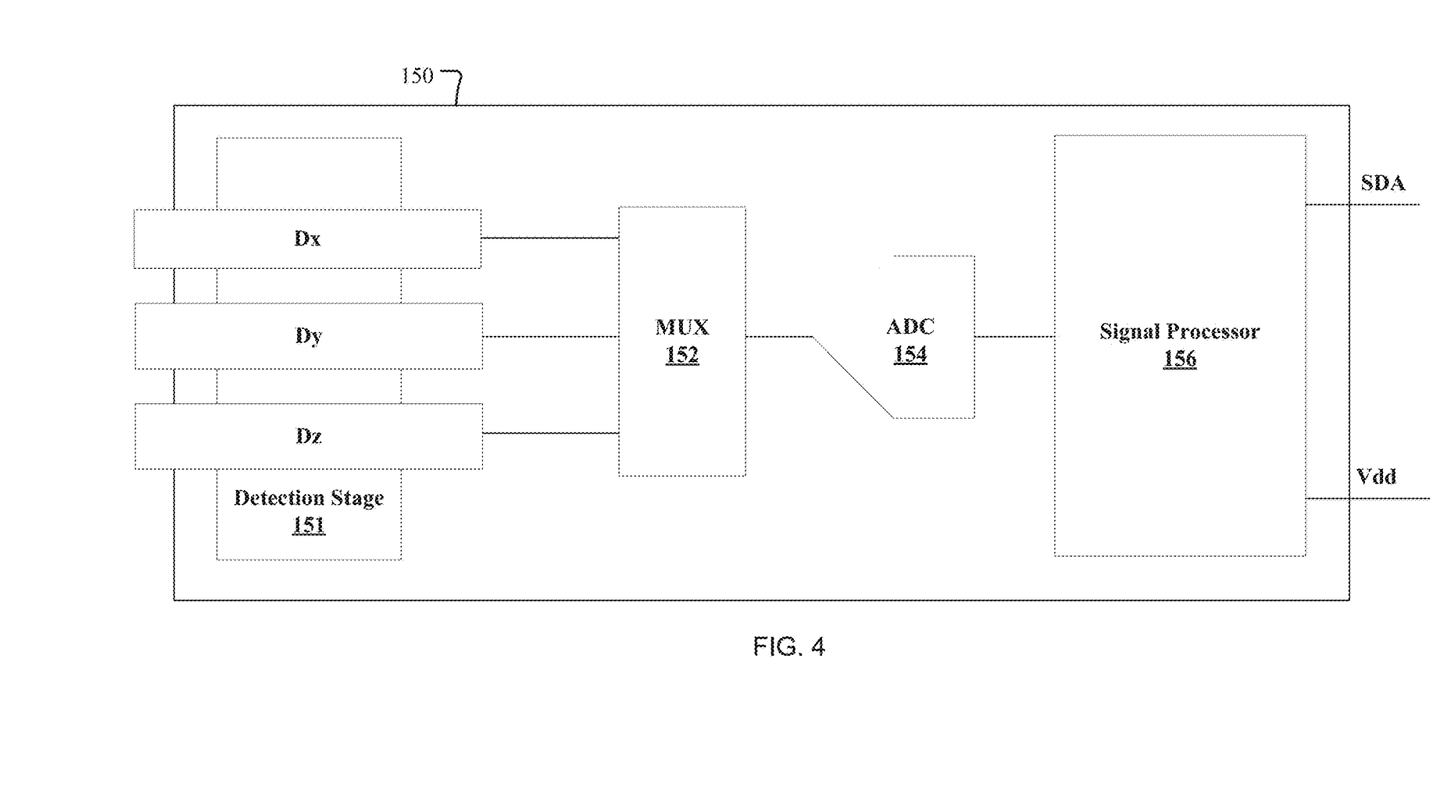
FIG. 4 is a detailed schematic view of a magnetometer of the magnetic displacement sensor system.

FIG. 4 schematically depicts the internal components of the magnetometer 150. In this example, the magnetometer 150 is the 3-axis magnetometer which includes a detection stage 151, a MUX (multiplexer) 152, an ADC (analog-digital converter) 154, and a signal processor 156. The detection stage 151 includes x, y, and z detectors Dx, Dy, Dz that detect the magnetic field strength along the x-axis, the y-axis, and the z-axis, respectively. The MUX 152, ADS 154, and then the signal processor 156 process the detected magnetic field strength measurements. The sensor controller 138 receives the processed magnetic field strength measurements from the signal processor 156 via the data pin SDA. The magnetometer 150 is powered (from the sensor power bus) at the positive supply voltage pin Vdd of the signal processor 156.

Figure 5A:
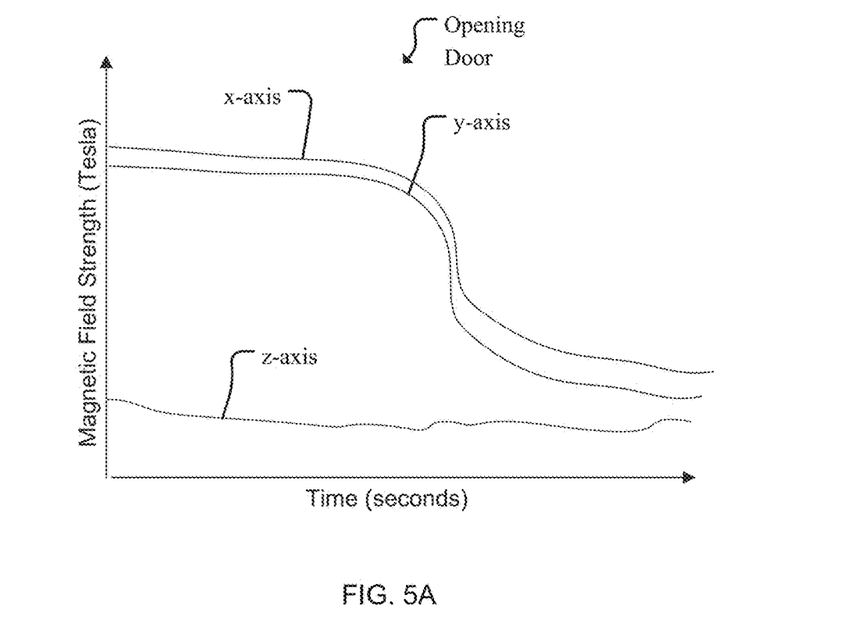
FIGS. 5A-5B are magnetic field plots for a three axis magnetometer when a door is opened and when the door is closed, respectively.
Figure 5B:
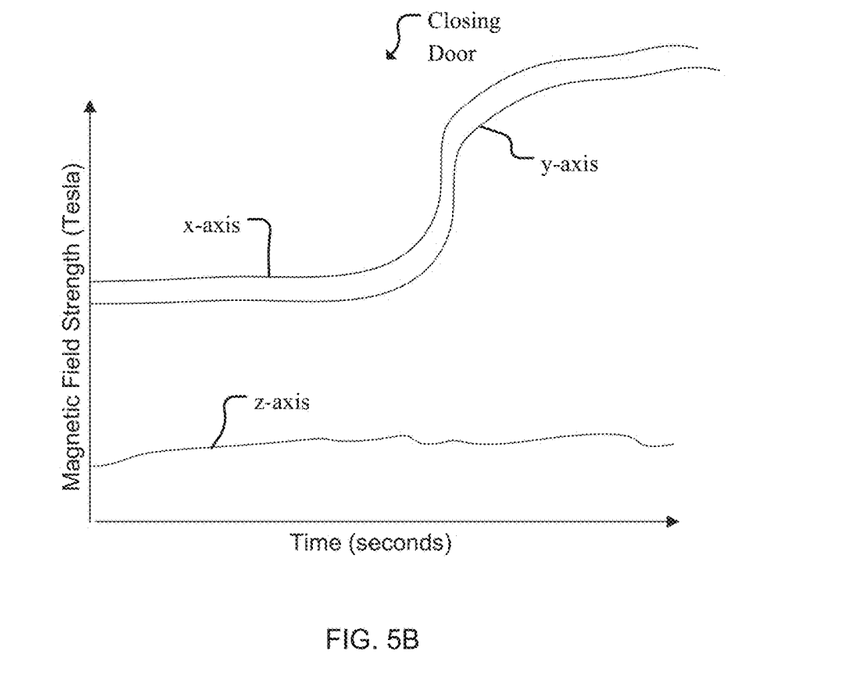

FIGS. 5A-5B are example plots of the detected magnetic field strength (T) vs. time (seconds) along the x-axis, the y-axis, and the z-axis for the 3-axis magnetometer for an event. These plots represent opening/closing events for a door and specifically, the event data contents of the ring buffer that are sent to the control panel. FIG. 5A is an opening event when the door is opened (decreasing magnetic field strength over time for x-axis and y-axis) and FIG. 5B is a closing event when the door is closed (increasing magnetic field strength over time for x-axis and y-axis). These plots represent an example of event data that is transmitted by the displacement sensors S to the system control panel 102.

Figure 6A:
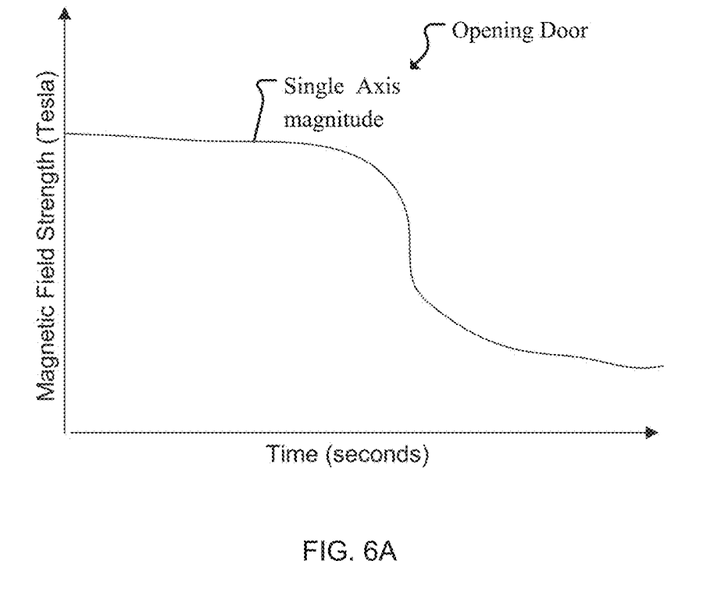
FIGS. 6A-6B are magnetic field plots for a single axis magnetometer when the door is opened and when the door is closed, respectively.
Figure 6B:
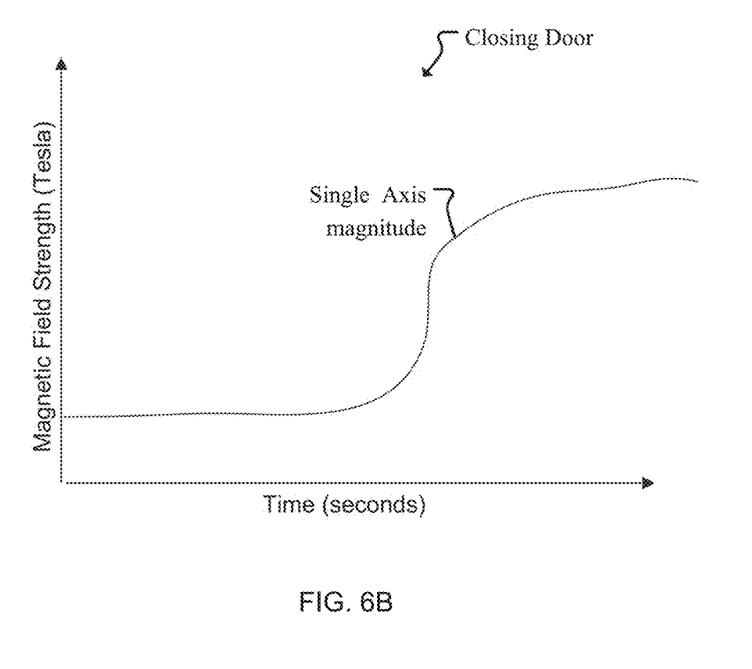

FIGS. 6A-6B are example plots of a magnitude of magnetic field strength (T) vs, time (seconds) for the single axis magnetometer. Similar to FIGS. 5A-5B, these plots represent opening/closing events for the door and specifically, the event data contents of the ring buffer that are sent to the control panel. FIG. 6A is an opening event when the door is opened (decreasing magnetic field strength over time) and FIG. 5B is a closing event when the door is closed (increasing magnetic field strength over time).

Figure 7:
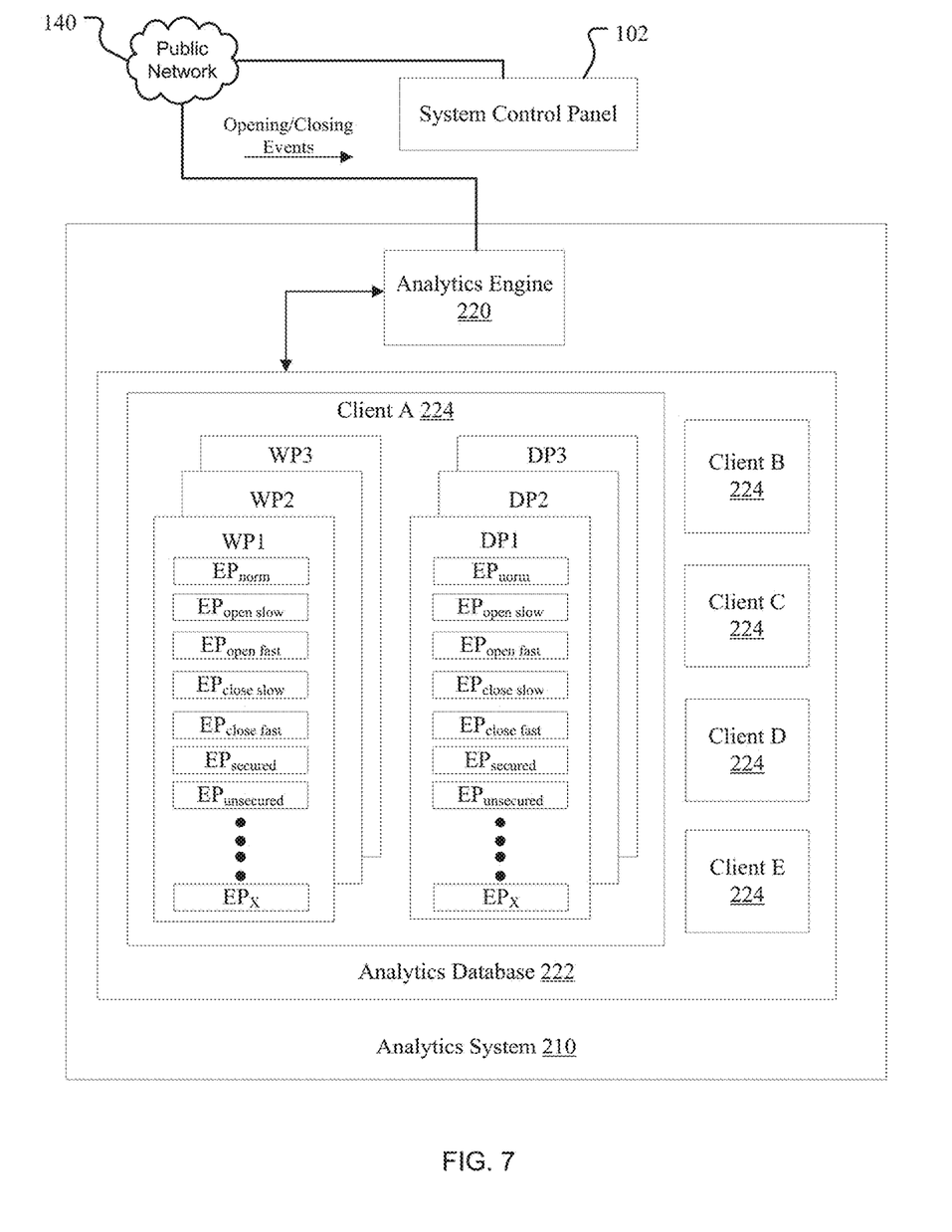
FIG. 7 is a block diagram of the analytics system.

FIG. 7 is a detailed view of the internal components of the analytics system 210.

The analytics system 210 includes an analytics database 222 for storing multiple clients 224 such as clients A, B, C, D, and E. Each client 224 includes one or more window profiles WP1, WP2, WP3 . . . WP# or door profiles DP1, DP2, DP3 . . . DP# or other profiles associated with other monitored things. Each window profile WP# or door profile DP# corresponds with one of the windows 113 or doors 112, respectively, in one example.

The window profiles WP# and door profiles DP# include one or more event profiles $EP_x$ (e.g., normalized event profile $EP_{norm}$, fast opening event profile $EP_{open\ fast}$, fast closing event profile $EP_{close\ fast}$, slow opening event profile $EP_{open\ slow}$, slow closing event profile $EP_{close\ slow}$, secured state event profile $EP_{secured}$, unsecured state event profile $EP_{unsecured}$, etc.). The normalized event profile $EP_{norm}$ represents an average of the detected magnetic field strength event data for the door 112/window 113. The time axis has been normalized to a common time scale so that it can be used to assess both fast and slow events. The fast opening event profile $EP_{open\ fast}$ is a magnetic field strength event data when the door 112/window 113 is opened quickly. The fast closing event profile $EP_{close\ fast}$ is a magnetic field strength event data when the door 112/window 113 is closed quickly. The slow opening event profile $EP_{open\ slow}$ is a magnetic field strength event data when the door 112/window 113 is opened slowly. The slow closing event profile $EP_{close\ slow}$ is a magnetic field strength event data when the door 112/window 113 is closed slowly. The secured state event profile $EP_{secured}$ is a magnetic field strength plot when the door 112/window 113 is in a closed stated (e.g., door 112 is secured to the door frame 207). The unsecured state event profile $EP_{unsecured}$ is a magnetic field strength plot when the door 112/window 113 is in an open state (e.g., door 112 is not secured to the door frame 207).

The analytics system 210 includes an analytics engine 220. The analytics engine 220 analyzes the opening/closing events received from the displacement sensors S. Based on this analysis, the analytics engine 220 can generate new event profiles EPx or update current event profiles EPx. The analytics engine can also generate new clients 224 and new window/door profiles WP#/DP# based on receipt of events from a new displacement sensor S for a new door or new window.

Figure 8A:
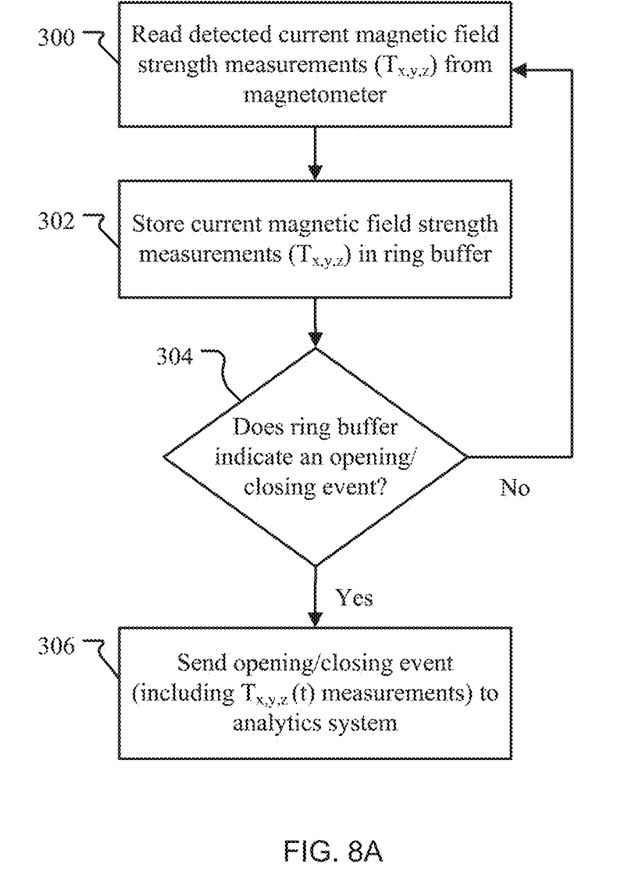
FIG. 8A is a flow chart illustrating a method of operation of the magnetic displacement sensor system to process detected magnetic field strength measurements.

FIG. 8A is a flow chart illustrating a method of using the displacement sensor S to indicate the opening/closing events and then forward these events to the system control panel 102. Initially, in step 300, the sensor controller 138 reads detected current magnetic field strength measurements ($T_{x,y,z}$) from the magnetometer 150. The reading occurs periodically, at intervals of usually less than a 1 second, preferably less than 500 milliseconds or even less than 100 milliseconds. The sensor controller 138 stores the current magnetic field strength measurements $T_{x,y,z}$) in the ring buffer 139 (step 302). Usually the ring buffer stores measurements from the previous 1 second or longer to 10 seconds or more. In step 304, the sensor controller 138 determines whether the ring buffer 139 indicates an opening/closing event. This indication can be accomplished, for example, by comparing the stored current magnetic field strength measurements ($T_{x,y,z}$) against generic magnetic field strengths for the secured and/or unsecured states (e.g., magnetic field strength thresholds) that relate to a door/window opening or closing. If no opening/closing event is identified, step 300 is repeated. If the opening/closing event is identified, the sensor controller 138 sends the opening/closing event (including event data such as $T_{x,y,z}$(t) measurements) to the control panel 102 and then to the analytics system 210 or directly to the analytics system 210 (step 306).

Figure 8B:
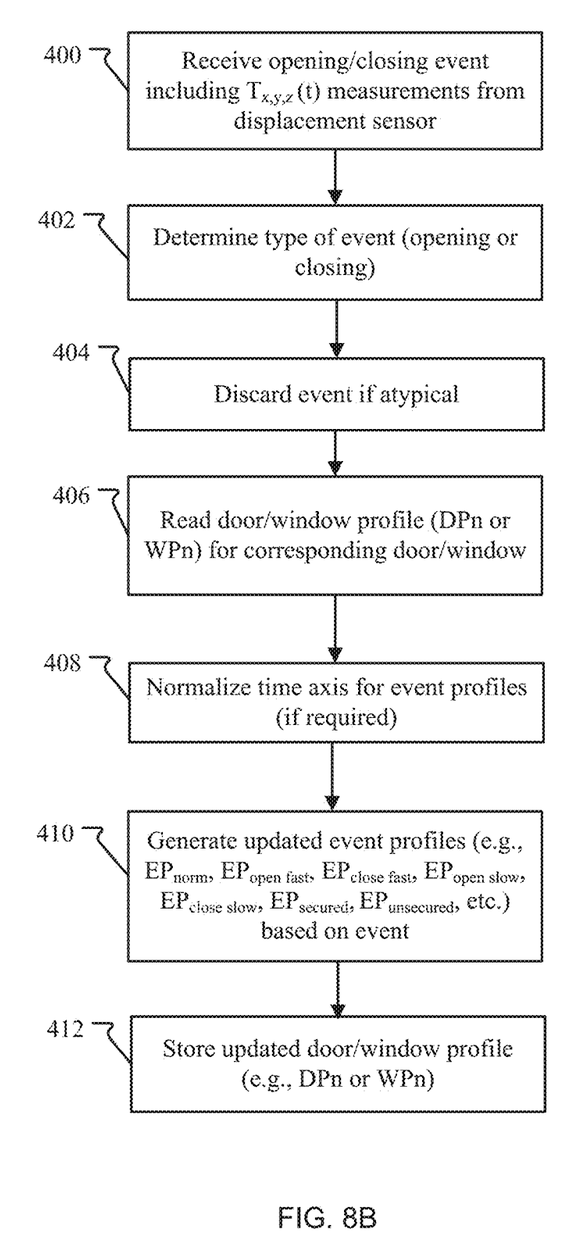
FIG. 8B is a flow chart illustrating a method of training the analytics system based on received magnetic field strength measurements.

FIG. 8B is a flow chart illustrating a method of training the analytics system 210 based on receipt of the magnetic field strength measurements ($T_{x,y,z}$(t)) (i.e., event data) from one of the displacement sensors S. In step 400, the analytics system 210 receives the opening/closing event (including $T_{x,y,z}$(t) measurements) from the displacement sensor S. The analytics system 210 determines a type of event: opening or closing (step 402). In step 404, the analytics system 210 discards the event data if atypical. Then, in step 406, the analytics system 210 reads the door/window profile (DPn or WPn) for the door/window corresponding with received opening/closing event. If necessary, the analytics system 210 normalizes a time axis for the event profiles EPx corresponding with the door/window (step 408). In step 410, the analytics system 210 dynamically updates the event profiles (e.g., $EP_{norm}$, $EP_{open\,fast}$, $EP_{close\,fast}$, $EP_{open\,slow}$, $EP_{close\,slow}$, $EP_{secured}$, $EP_{unsecured}$, etc.) based on the received opening/closing event. The analytics system 210 stores the updated door/window profile (e.g., DPn or WPn) in one of the clients 224 (e.g., client A) which is stored in the analytics database 222.

Figure 8C:
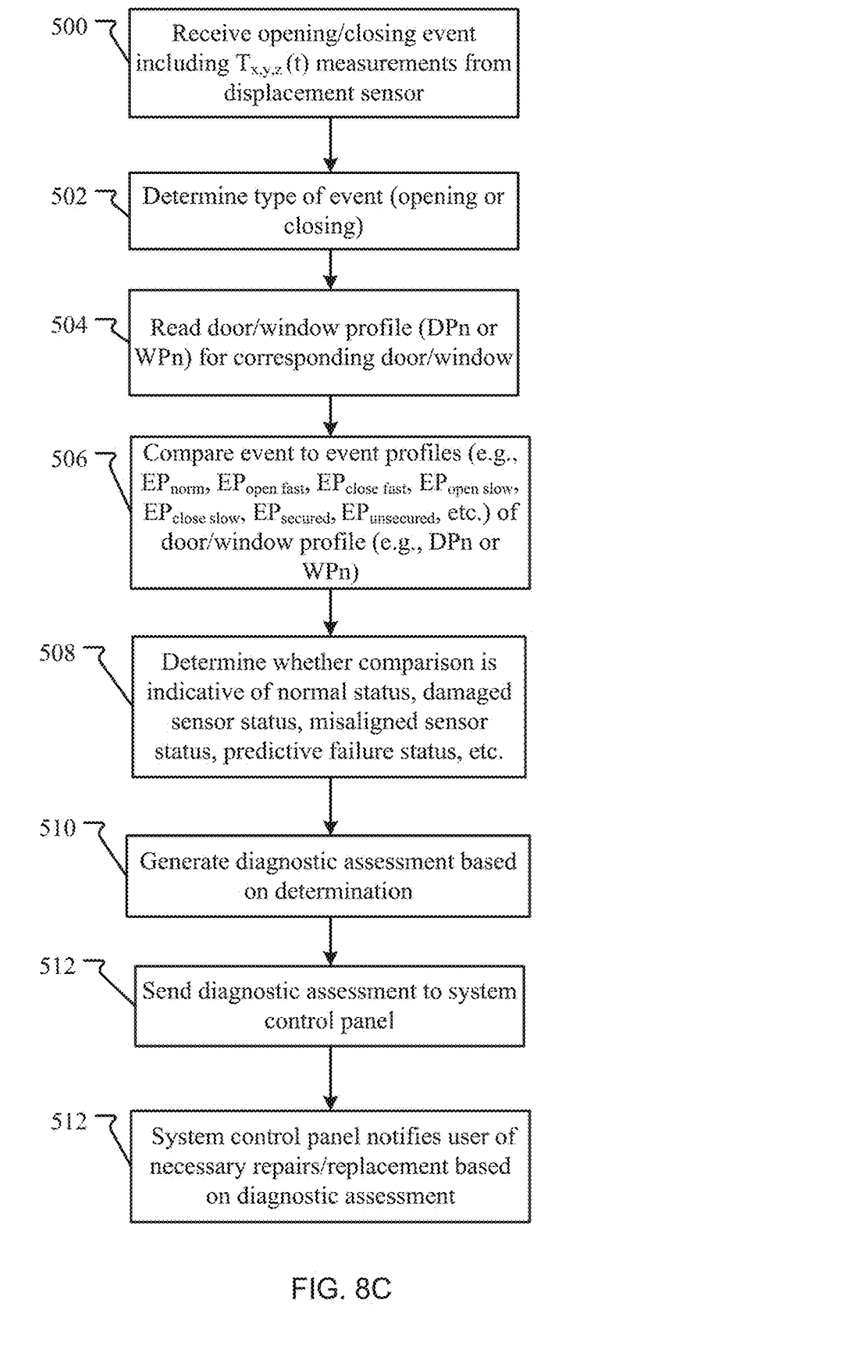
FIG. 8C is a flow chart illustrating a method of operating the analytics system with the magnetic displacement sensor system.

FIG. 8C is a flow chart illustrating a method of operating the analytics system 210. In step 500, the analytics system 210 receives the opening/closing event data including $T_{x,y,z}(t)$ measurements from the displacement sensor S. The analytics system 210 determines a type of event: opening or closing (step 502). In step 504, the analytics system 210 reads the door/window profile (DPn or WPn) for the door/window corresponding with received opening/closing event. The analytics system 210 compares the opening/closing event data to event profiles EPx (e.g., $EP_{norm}$, $EP_{open\,fast}$, $EP_{close\,fast}$, $EP_{open\,slow}$, $EP_{close\,slow}$, $EP_{secured}$, $EP_{unsecured}$, etc.) of the corresponding door/window profile (e.g., WP1 or DP1) (step 506). In step 508, the analytics system 210 determines whether this comparison is indicative of a normal status, a damaged sensor status, a disconnected sensor status, a predictive failure status (i.e., the operation of the sensor appear to be eroding over time), etc. For example, the analytics system 210 can determine whether a pattern associated with the opening/closing event matches an expected pattern of the event profile EPx. If there is a match, the analytics system 210 determines that the status is normal (i.e., normal status). If there is not a match, the analytics system can determine whether the differences between patterns correspond to the damaged sensor status, the disconnected sensor status, or a sensor that might fail (predictive failure status), for example.

In step 510, the analytics system 210 then generates a diagnostic assessment based on this determination (step 510). This diagnostic assessment of the magnetic displacement sensor system 240 over time allows for improved nuisance/false alarm management fir the magnetic displacement sensor system 240. The analytics system 210 sends the diagnostic assessment to the system control panel 102 (step 512). The system control panel 102 notifies users of necessary repairs/replacements based on the diagnostic assessment.

The diagnostic assessment can include a variety of information related to the status of the magnetic displacement sensor system 240. For example, the diagnostic assessment can include information on a distance between the magnet M and the displacement sensor S as determined from the detected magnetic field strength. Also, for example, the diagnostic assessment can include information on the comparison between opening/closing events and event profile EPx such as whether the magnetic field strength of the event is sufficiently high compared to the expected magnetic field strength of the event profile EPx. In another example, the diagnostic assessment can include information on whether the displacement sensor S has shown any intermittent weakening in its ability to detect the magnetic field from the magnet M. Other information related to the status of the of the magnetic displacement sensor system 240 can be included in the diagnostic assessment as appreciated by one of skill in the art.

While this invention has been particularly shown and described with references to preferred embodiments thereof, it will be understood by those skilled in the art that various changes in form and details may be made therein without departing from the scope of the invention encompassed by the appended claims.

What is claimed is:

1. A security system, comprising:
 a magnetic displacement sensor system including a displacement sensor for detecting magnetic field strengths from a magnet over a time period and identifying an event based on the magnetic field strengths over the time period; and
 an analytics system in communication with the magnetic displacement sensor system and comprising:
  an analytics database storing one or more event profiles for the magnetic displacement sensor system, each event profile including magnetic field strength changes and a represented event represented thereby; and
  an analytics engine for determining a status indicative of a validity of data received from the magnetic displacement sensor system based on a comparison of the magnetic field strengths and an event profile stored in the analytics database in association with the event for the magnetic displacement sensor system.

2. The security system according to claim 1, wherein the analytics engine updates the event profile based on the magnetic field strengths.

3. The security system according to claim 1, wherein the analytics system is integrated within a system control panel.

4. The security system according to claim 1, wherein the analytics system is implemented as a cloud-based system comprising multiple profiles stored in the analytics database for each client.

5. The security system according to claim 1, wherein the event profile is a time normalized profile, an open slow profile, a closed slow profile, an open fast profile, a closed fast profile, a secured state profile, or an unsecured state profile.

6. The security system according to claim 1, wherein the status is a normal status, a damaged sensor status, a disconnected sensor status, or a predictive failure status.

7. The security system according to claim 1, wherein the magnetic displacement sensor system comprises a 3-axis magnetometer having a detection stage for detecting the magnetic field strengths along an x-axis, a y-axis, and a z-axis.

8. The security system according to claim 7, wherein the displacement sensor comprises a controller for reading the magnetic field strengths from the 3-axis magnetometer and determining if the magnetic field strengths indicate the event.

9. The security system according to claim 8, wherein the controller comprises a buffer for storing the magnetic field strengths.

10. The security system according to claim 8, wherein the 3-axis magnetometer and the controller are integrated on a single chip.

11. The security system according to claim 1, wherein the displacement sensor is powered by a battery and the displacement sensor comprises a parasitic power-harvesting circuit for charging the battery.

12. The security system according to claim 1, further comprising a system control panel for powering the displacement sensor via a network.

13. A method for assessing a status of a magnetic displacement sensor system, comprising:
    detecting, by the magnetic displacement sensor system, magnetic field strengths from a magnet over a time period;
    determining if the magnetic field strengths over the time period indicate an event;
    sending the event including the magnetic field strengths to an analytics system;
    comparing, by an analytics engine of the analytics system, the magnetic field strengths to an event profile stored in an analytics database of the analytics system in association with the event for the magnetic displacement sensor system, the analytics database storing one or more event profiles for the magnetic displacement sensor system, each profile including magnetic field strength changes and a represented event represented thereby; and
    determining the status indicative of a validity of data received from the magnetic displacement sensor system based on the comparing.

14. The method according to claim 13, wherein the status is a normal status, a damaged sensor status, a disconnected sensor status, or a predictive failure status.

15. The method according to claim 13, further comprising determining, by the analytics engine, that the event is an opening type of event or a closing type of event.

16. The method according to claim 13, further comprising normalizing, by the analytics engine, a time axis for the event profile.

17. The method according to claim 13, further comprising dynamically updating, by the analytics engine, the event profile based on receipt of multiple events from the magnetic displacement sensor system over time.

18. The method according to claim 13, wherein the event profile is a time normalized profile, an open slow profile, a closed slow profile, an open fast profile, a closed fast profile, a secured state profile, or an unsecured state profile.

19. The method according to claim 13, further comprising:
    generating, by the analytics engine, a diagnostic assessment based on the status of the magnetic displacement sensor system;
    sending, by the analytics engine, the diagnostic assessment to a system control panel; and
    notifying, by the system control panel, a user of necessary repairs based on the diagnostic assessment.

20. A magnetic displacement sensor system, comprising:
    a magnet mounted to a window or a door; and
    a magnetic displacement sensor comprising:
        an interface in communication with a network;
        a magnetometer for detecting magnetic field strengths from the magnet over a time period; and
        a controller for reading the magnetic field strengths from the magnetometer and determining if the magnetic field strengths over the time period indicate an event, wherein the controller sends the event, including the magnetic field strengths, to an analytics system via the interface, the analytics system comprising an analytics engine and an analytics database storing one or more event profiles for the magnetic displacement sensor, each profile including magnetic field strength changes and a represented event represented thereby, the analytics engine determining a status indicative of a validity of data received from the magnetic displacement sensor system based on a comparison of the magnetic field strengths and an event profile stored in the analytics database in association with the event for the magnetic displacement sensor system.

21. An analytics system comprising:
    an analytics database storing one or more event profiles for a magnetic displacement sensor system, each event profile including magnetic field strength changes and a represented event represented thereby; and
    an analytics engine for:
        receiving magnetic field strengths detected by the magnetic displacement sensor over a time period and an event identified therefrom; and
        determining a status indicative of a validity of data received from the magnetic displacement sensor system based on a comparison of the magnetic field strengths and an event profile stored in the analytics database in association with the event for the magnetic displacement sensor system.

22. The security system according to claim 1, wherein the analytics engine compares patterns associated with the magnetic field strengths and the event profile.

23. The method according to claim 13, further comprising comparing, by the analytics engine, patterns associated with the event and the event profile.

* * * * *

UNITED STATES PATENT AND TRADEMARK OFFICE
CERTIFICATE OF CORRECTION

PATENT NO. : 10,393,554 B2
APPLICATION NO. : 15/019260
DATED : August 27, 2019
INVENTOR(S) : Richard John Campero et al.

Page 1 of 1

It is certified that error appears in the above-identified patent and that said Letters Patent is hereby corrected as shown below:

In the Specification

Column 7, Line 50, replace "vs," with -- vs. --

Column 9, Line 47, replace "fir" with -- for --

Signed and Sealed this
Twelfth Day of November, 2019

Andrei Iancu
*Director of the United States Patent and Trademark Office*